(12) United States Patent
Gonze et al.

(10) Patent No.: US 8,359,844 B2
(45) Date of Patent: Jan. 29, 2013

(54) RADIANT HEATING SYSTEMS AND METHODS FOR CATALYSTS OF EXHAUST TREATMENT SYSTEMS

(75) Inventors: Eugene V. Gonze, Pinckney, MI (US); Halim G. Santoso, Novi, MI (US); Brian Spohn, Holly, MI (US); Bryan Nathaniel Roos, Novi, MI (US)

(73) Assignee: GM Global Technology Operations LLC

( * ) Notice: Subject to any disclaimer, the term of this patent is extended or adjusted under 35 U.S.C. 154(b) by 390 days.

(21) Appl. No.: 12/537,384

(22) Filed: Aug. 7, 2009

(65) Prior Publication Data

US 2011/0030344 A1 Feb. 10, 2011

(51) Int. Cl.
*F01N 3/00* (2006.01)
(52) U.S. Cl. ............... 60/300; 60/286; 60/303; 422/174
(58) Field of Classification Search .................... 60/286, 60/284, 300, 303; 422/174
See application file for complete search history.

(56) References Cited

U.S. PATENT DOCUMENTS

| | | | | |
|---|---|---|---|---|
| 5,234,668 A | * | 8/1993 | Harada et al. | 422/174 |
| 5,465,573 A | * | 11/1995 | Abe et al. | 60/274 |
| 5,537,321 A | * | 7/1996 | Yoshizaki et al. | 701/99 |
| 5,566,774 A | * | 10/1996 | Yoshida | 180/65.245 |
| 5,713,198 A | * | 2/1998 | Aoki et al. | 60/277 |
| 6,585,940 B2 | * | 7/2003 | Abe et al. | 422/211 |

FOREIGN PATENT DOCUMENTS

JP 09158715 A * 6/1997

OTHER PUBLICATIONS

U.S. Appl. No. 12/537,373, filed Aug. 7, 2009, Eugene V. Gonze.

* cited by examiner

*Primary Examiner* — Kenneth Bomberg
*Assistant Examiner* — Abdul Elnoubi

(57) ABSTRACT

An exhaust treatment system comprises M three-way catalysts and N electrically heated catalysts (EHCs). The M three-way catalysts are arranged to receive exhaust gas output by an engine of a hybrid vehicle. M is an integer greater than one. The N EHCs are arranged to receive the exhaust gas and provide radiant heat to the M three-way catalysts when the N EHCs are powered. N is an integer greater than one.

19 Claims, 4 Drawing Sheets

RADIANT HEATING SYSTEMS AND METHODS FOR CATALYSTS OF EXHAUST TREATMENT SYSTEMS

CROSS-REFERENCE TO RELATED APPLICATIONS

This application is related to U.S. patent application Ser. No. 12/537,373 filed on Aug. 7, 2009. The disclosure of the above application is incorporated herein by reference in its entirety.

FIELD

The present disclosure relates generally to internal combustion engines and more particularly to exhaust treatment systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. A byproduct of combustion is exhaust gas. The exhaust gas may include various components, such as nitrogen oxides (NOx), carbon monoxide (CO), and hydrocarbons (HC). An exhaust treatment system includes a catalyst that converts the NOx, CO, and HC to carbon dioxide and water.

Conversion efficiency of the catalyst refers to the catalyst's ability to react with or convert one or more components of the exhaust gas. The conversion efficiency of the catalyst is related to the temperature of the catalyst. The catalyst may operate at a reduced conversion efficiency when the catalyst temperature is less than a threshold temperature. The catalyst efficiency may be increased by increasing the catalyst temperature to be greater than or equal to the threshold temperature.

The catalyst temperature may be increased using various methods. For example only, heat from the exhaust gas exiting the engine may increase the catalyst temperature. The exhaust gas transfers heat to the catalyst via convection, thereby increasing the catalyst temperature. Fueling to the engine may also be adjusted to increase the catalyst temperature. For example only, unburned fuel from the engine may enter the catalyst where the fuel combusts with oxygen in the catalyst to increase the catalyst temperature. Air may be pumped into the exhaust gas and/or catalyst to increase the amount of oxygen in the catalyst.

Hybrid vehicles generally have two power sources: the internal combustion engine and an electric motor. The electric motor is used more often as a power source in city driving where vehicle kinetic energy can be recovered by regenerative braking, converted to electric and chemical form, and stored in a battery, from which the motor is driven. The internal combustion engine is more suitable during highway driving, during which braking and opportunities for energy recovery are infrequent, and the engine operates at its greatest efficiency. In mixed city and highway driving conditions, the electric motor and combustion engine may be used together to transmit power to a transmission input shaft, depending on driving conditions and the magnitude of the battery capacity.

Hybrid vehicles may experience long periods of engine off-time during idling and driving scenarios. During the period that the engine is off, the catalyst temperature may fall below the threshold temperature. Accordingly, catalyst heating may be required to obtain the peak efficiency of the catalyst. Maintaining the catalyst temperature at approximately the threshold temperature during engine-off periods increases the conversion efficiency of the catalyst when the engine is started.

SUMMARY

An exhaust treatment system comprises M three-way catalysts and N electrically heated catalysts (EHCs). The M three-way catalysts are arranged to receive exhaust gas output by an engine of a hybrid vehicle. M is an integer greater than one. The N EHCs are arranged to receive the exhaust gas and provide radiant heat to the M three-way catalysts when the N EHCs are powered. N is an integer greater than one.

A hybrid vehicle system comprises the exhaust treatment system and an engine control module (ECM). The ECM applies power to the N EHCs when an event occurs.

In other features, the ECM applies power to all of the N EHCs when the event occurs.

In still other features, the event occurs when combustion within the engine is disabled.

In further features, the event occurs when combustion within the engine is disabled and torque transfer to one or more wheels of a hybrid vehicle is controlled by one or more electric motors.

In still further features, the event occurs when an exhaust flowrate in an exhaust system is zero.

In other features, the ECM regulates temperature of the M three-way catalysts based on a predetermined catalyst temperature when the events occurs.

In still other features, the ECM warms the M three-way catalysts to the predetermined catalyst temperature before combustion within the engine is enabled.

In further features, the ECM controls the power to regulate the temperatures of the M three-way catalysts based on the predetermined catalyst temperature.

In still further features, N is less than nine.

An exhaust treatment method comprises: implementing M three-way catalysts to receive exhaust gas output by an engine of a hybrid vehicle, wherein M is an integer greater than one; implementing N electrically heated catalysts (EHCs) to receive the exhaust gas, wherein N is an integer greater than one; and providing radiant heat to the M three-way catalysts using the N EHCs.

In other features, the exhaust treatment method further comprises providing the radiant heat by selectively applying power to the N EHCs when an event occurs.

In still other features, the exhaust treatment method further comprises providing the radiant heat by applying power all of the N EHCs when the event occurs.

In further features, the event occurs when combustion within the engine is disabled.

In still further features, the event occurs when combustion within the engine is disabled and torque transfer to one or more wheels of a hybrid vehicle is controlled by one or more electric motors.

In other features, the event occurs when an exhaust flowrate in an exhaust system is zero.

In still other features, the exhaust treatment method further comprises regulating temperature of the M three-way catalysts based on a predetermined catalyst temperature when the events occurs.

In further features, the exhaust treatment method further comprises warming the M three-way catalysts to the predetermined catalyst temperature before combustion within the engine is enabled.

In still further features, the exhaust treatment method further comprises regulating the temperature of the M three-way catalysts based on the predetermined catalyst temperature by controlling the application of power.

In other features, N is less than nine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
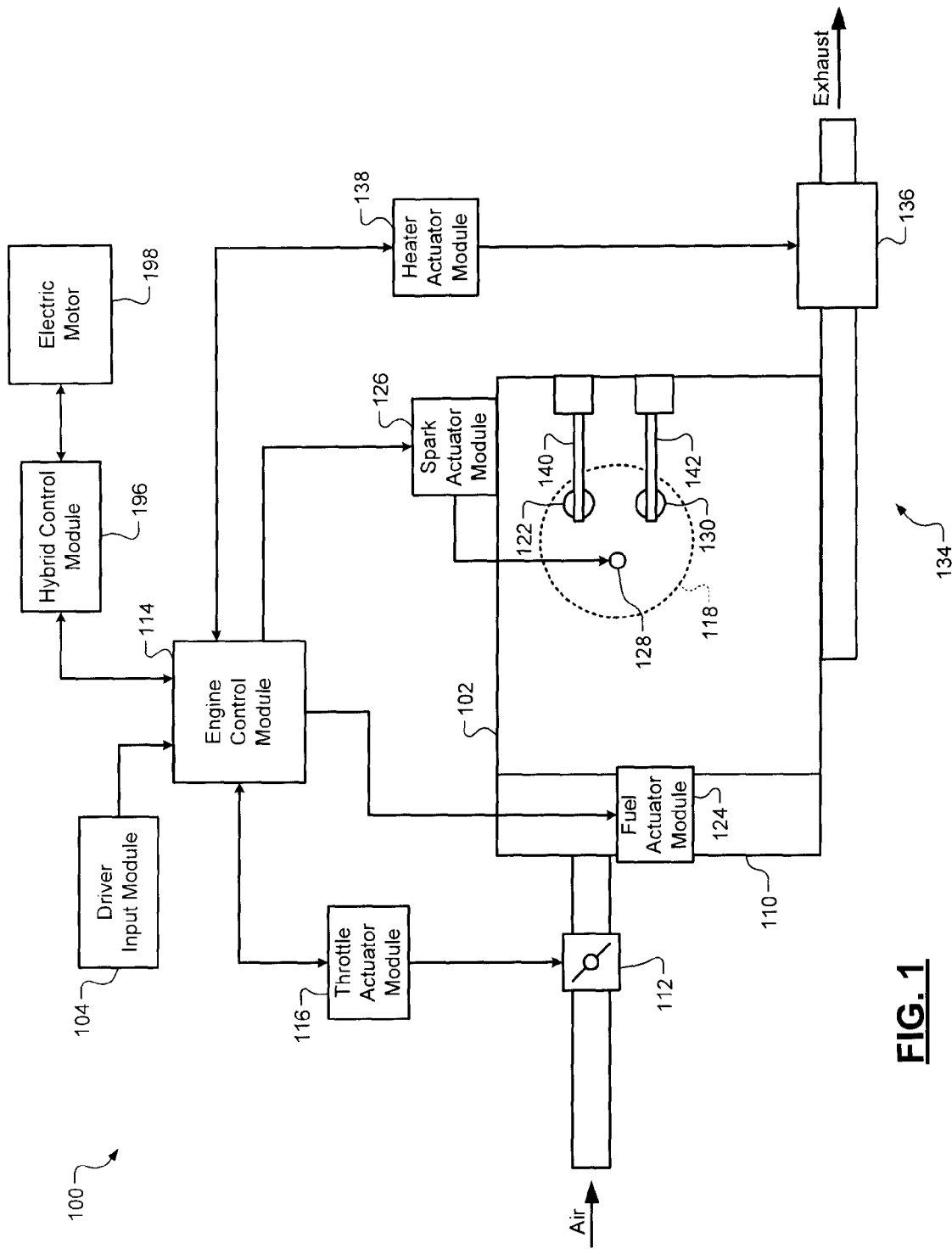
FIG. 1 is a functional block diagram of an exemplary hybrid vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit that provides the described functionality.

A hybrid vehicle includes an engine and one or more electric motors that control drive torque output to wheels of the vehicle. In some circumstances, the engine is disabled and torque output to the wheels is controlled by the one or more electric motors. The engine may be disabled to, for example, increase the vehicle's fuel efficiency.

An exhaust system that receives exhaust gas output by the engine includes a plurality of electrically heated catalysts (EHCs) and a plurality of three-way catalysts (TWCs). The EHCs and the TWCs include a catalyst material that reacts with various components of the exhaust gas to reduce the amount of those components in the exhaust gas. The catalysts of the EHCs and the TWCs, however, react with the targeted components of the exhaust gas at temperatures at or above a predetermined (i.e., threshold) temperature, such as 300° C. While the engine is disabled, the temperature of the catalysts may fall below the predetermined temperature.

Accordingly, power is applied to the EHCs to heat the catalyst of the EHCs to or above the predetermined temperature while the engine is disabled. The application of power to the EHCs also generates radiant heat that radiates to the TWCs to warm the catalysts of the TWCs to or above the predetermined temperature. The electrical heating of the EHCs and the radiant heating of the TWCs increases the volume of catalyst that is at or above the predetermined temperature when the engine is re-enabled.

Implementation of more than one smaller EHC and TWC rather than a single larger EHC and TWC also decreases the period necessary to increase the temperature of the catalysts to the predetermined temperature. The implementation of more than one smaller EHC and TWC rather than the single larger EHC and TWC also provides more uniform heating and enables a lesser amount of power to be drawn to heat the catalysts to the predetermined temperature.

Referring now to FIG. 1, a functional block diagram of an exemplary hybrid vehicle system 100 is presented. The hybrid vehicle system 100 includes an engine 102 that combusts an air/fuel mixture to produce a drive torque based on a driver input module 104. Air is drawn into an intake manifold 110 through a throttle valve 112. For example only, the throttle valve 112 may include a butterfly valve having a rotatable blade. An engine control module (ECM) 114 may control a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. Air from the intake manifold 110 is drawn into the cylinder 118 through an intake valve 122.

The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The injected fuel mixes with air and creates an air/fuel mixture in the cylinder 118.

A piston (not shown) within the cylinder 118 compresses the air/fuel mixture. Based upon a signal from the ECM 114, a spark actuator module 126 may energize a spark plug 128 in the cylinder 118, which ignites the air/fuel mixture. The timing of the spark may be specified relative to the time when the piston is at its topmost position, referred to as top dead center (TDC). In diesel and compression ignition engines, compression by the piston may ignite the air/fuel mixture. The spark actuator module 126 may be controlled by a timing signal indicating how far before or after TDC the spark should be provided. Operation of the spark actuator module 126 may therefore be synchronized with crankshaft rotation.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the hybrid vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The exhaust system 134 includes a catalyst assembly 136. The catalyst assembly 136 includes a plurality of electrically heated catalysts (EHCs) and three-way catalysts (TWCs). The catalyst assembly 136 is discussed in detail below. A muffler (not shown) may be implemented in the exhaust system 134 downstream of the catalyst assembly 136. A heater actuator module 138 selectively applies power to one or more of the EHCs based on signals from the ECM 114.

The ECM 114 may use signals from various sensors to make control decisions for the hybrid vehicle system 100. The ECM 114 also controls operation of the engine 102 and the torque output of the engine 102. The ECM 114 may communicate with a hybrid control module 196 to coordinate operation of the engine 102 and an electric motor 198. While only the electric motor 198 is shown, the hybrid vehicle system 100 may include more than one electric motor.

In some circumstances, the electric motor 198 may be used to produce drive torque that supplements torque output by the engine 102. In other circumstances, the engine 102 may be shutdown (i.e., disabled) to increase fuel economy of the hybrid-vehicle. The electric motor 198 supplies drive torque for the hybrid vehicle during periods when the engine 102 is shutdown.

The electric motor 198 may also function as a generator. The electric motor 198 may be used to generate electrical energy for use by the various components of the hybrid vehicle system 100 and/or storage. In various implementations, various functions of the ECM 114 and the hybrid control module 196 may be integrated into one or more modules.

The ECM 114 selectively operates the hybrid vehicle in a combustion mode. The combustion mode includes using the engine 102 to produce drive torque. The ECM 114 also selectively operates the hybrid vehicle in an electric mode. The electric mode includes using the electric motor 198 to produce drive torque. The ECM 114 may operate the hybrid vehicle in a blended mode by using both the engine 102 and the electric motor 198 to produce drive torque. The ECM 114 may select the mode of operation based on a desired torque output, which may be based on a driver input.

Figure 2:
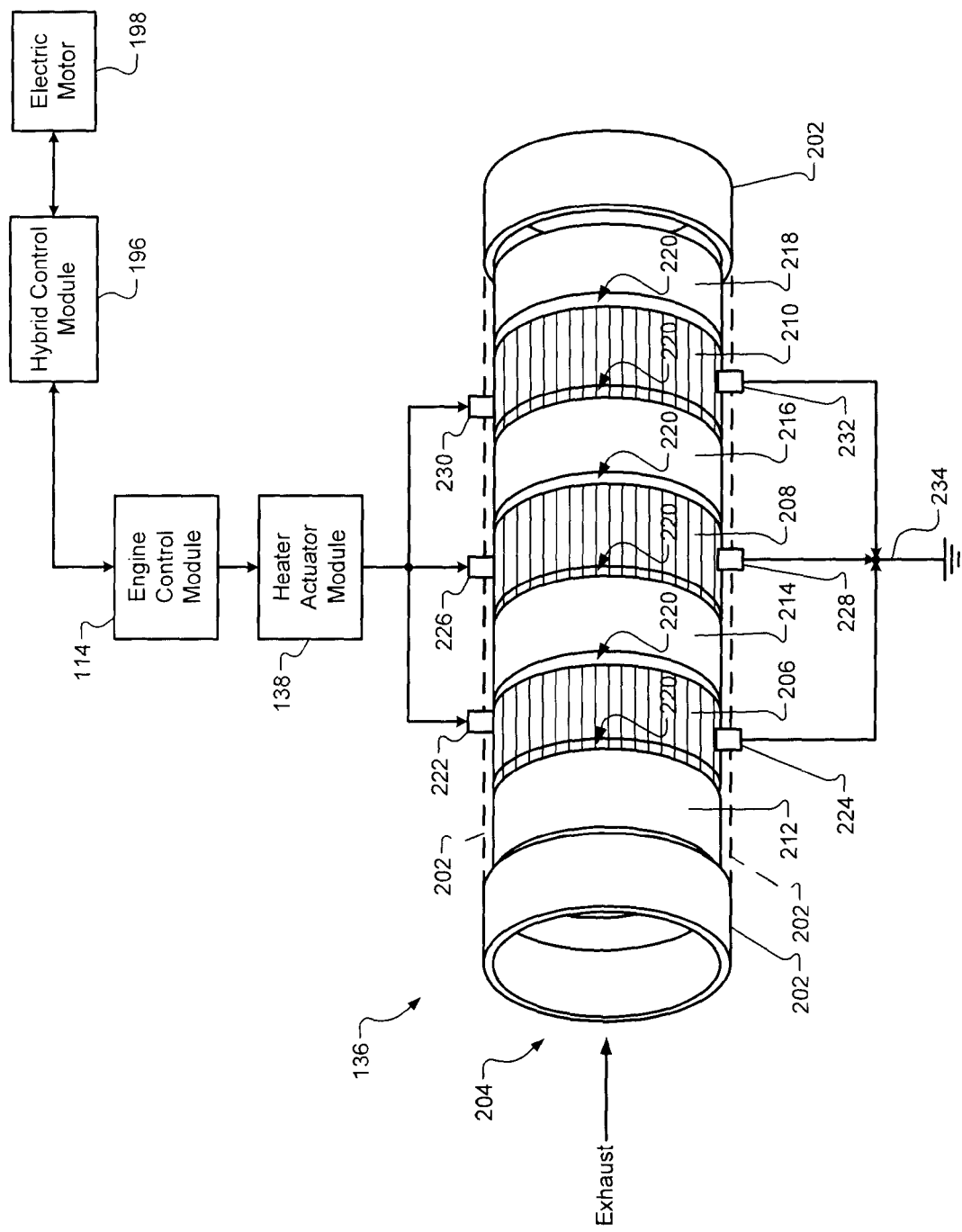
FIG. 2 is an exemplary segmented, cross-sectional perspective of a catalyst assembly including a plurality of electrically heated catalysts (EHCs) according to the principles of the present disclosure.

Referring now to FIG. 2, an exemplary segmented, cross-sectional perspective of the catalyst assembly 136 is presented. The catalyst assembly 136 includes a housing 202 that is coupled with the exhaust system 134 to receive exhaust gas output from the engine 102. The catalyst assembly 136 receives exhaust gas output by the engine 102 at an inlet 204.

Figure 3:
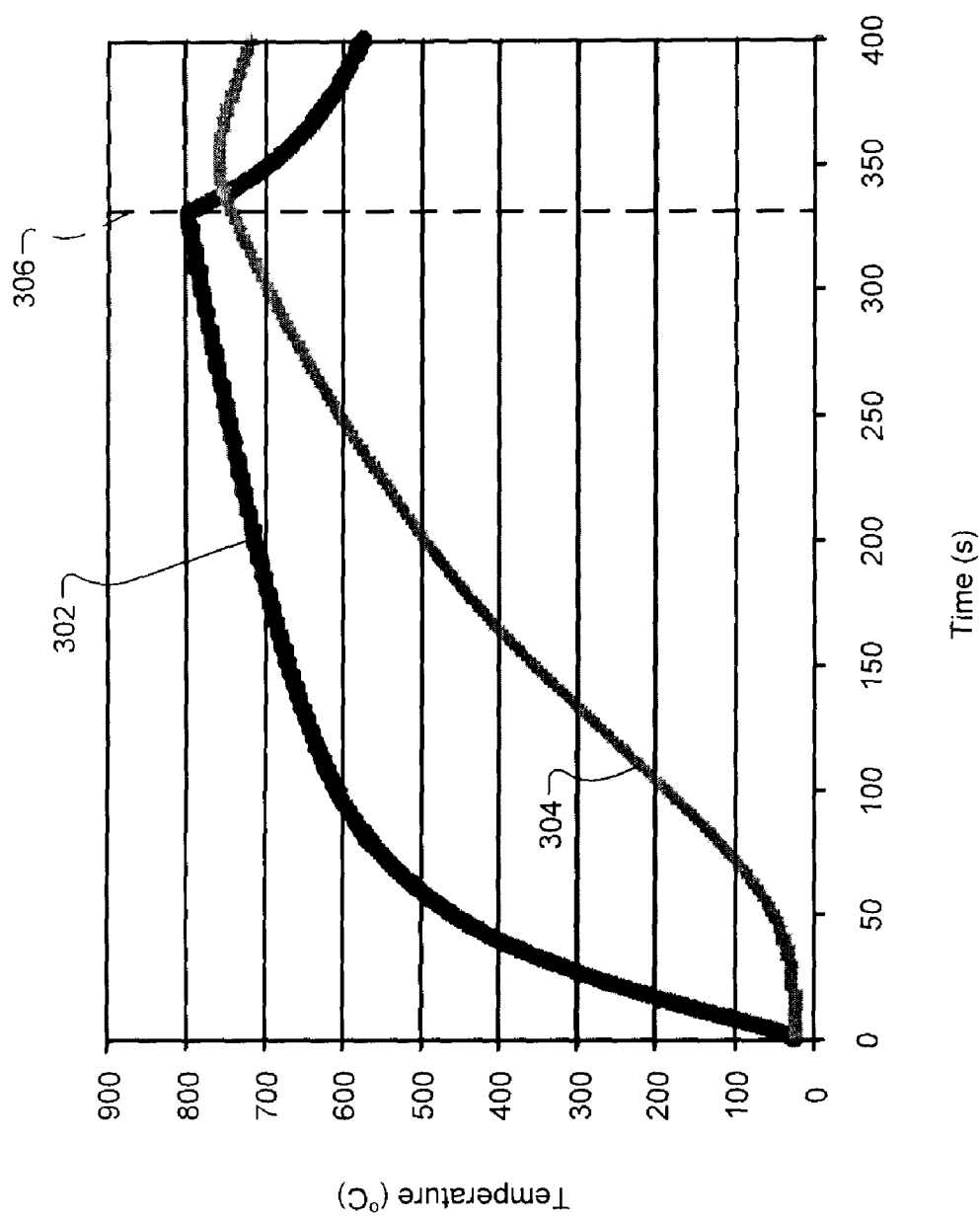
FIG. 3 is an exemplary graph of temperature versus time for the EHCs and passive, three-way catalysts according to the principles of the present disclosure.

A plurality of electrically heated catalysts (EHCs) are implemented within the housing 202 of the catalyst assembly 136. For example only, FIGS. 2-3 depict three EHCs 206, 208, and 210. While the three EHCs 206-210 are described and shown, the catalyst assembly 136 may include two or more EHCs. For example only, the number of EHCs implemented in a vehicle may be based on a battery load, load on the electric motor 198, an alternator/generator electrical output, and/or other electrical components associated with the electrical system of the vehicle.

Each of the EHCs 206-210 includes a substrate, such as cordierite, aluminum, and/or another suitable material. The substrates may be formed in a honeycomb arrangement or in another suitable arrangement. A catalyst is applied to each of the substrates of the EHCs 206-210. The catalyst may include, for example, platinum, rhodium, and/or another three-way catalyst. The catalyst reacts with various components of the exhaust gas to reduce the amount of those components in the exhaust gas.

A plurality of passive, three-way catalysts (TWCs) are also implemented within the housing 202 of the catalyst assembly 136. For example only, the catalyst assembly 136 includes four passive TWCs 212, 214, 216, and 218. While the four TWCs 212-218 are described and shown, the catalyst assembly 136 may include two or more TWCs. Each of the TWCs 212-218 also includes a substrate, such as cordierite, aluminum, and/or another suitable substrate. These substrates may also be formed in a honeycomb arrangement or in another suitable arrangement.

A catalyst is also applied to each of the substrates of the TWCs 212-218. The catalyst may include, for example, platinum, rhodium, and/or another suitable three-way catalyst. In some implementations, the same three-way catalyst is applied to both the TWCs 212-218 and the EHCs 206-210. The catalyst of the TWCs 212-218 also reacts with various components of the exhaust gas to reduce the amount of those components in the exhaust gas.

The EHCs 206-210 and TWCs 212-218 of the catalyst assembly 136 are arranged in a way to maximize radiant heat energy provided by the EHCs 206-210. For example only, in the exemplary implementation of FIG. 2, the EHCs 206-210 and the TWCs 212-218 are arranged to alternate between EHCs and passive TWCs. More specifically, the EHCs 206-210 and the TWCs 212-218 are arranged in the following order starting nearest to the inlet 204: first, the TWC 212; second, the EHC 206; third, the TWC 214; fourth, the EHC 208; fifth, the TWC 216; sixth, the EHC 210; and seventh, the TWC 218.

Each of the EHCs 206-210 is separated from each of the TWCs 212-218. In other words, a buffer zone is provided between each of the EHCs 206-210 and the TWCs 212-218. Exemplary buffer zones between the EHCs 206-210 and the TWCs 212-218 are illustrated by buffer zones 220. The buffer zones 220 may be implemented to, for example, prevent electrical grounding of the EHCs 206-210.

The catalysts of the EHCs 206-210 and the TWCs 212-218 are effective in reacting with the exhaust gas when the temperature of the catalyst is greater than the threshold temperature (e.g., 300° C.). The heater actuator module 138 selectively applies power to the EHCs 206-210 based on signals from the ECM 114. The heater actuator module 138 applies power to the EHCs 206-210 via electrical connectors that are associated with each of the EHCs 206-210. For example only, electrical connectors 222 and 224 are associated with the EHC 206. Electrical connectors 226 and 228 are associated with the EHC 208, and electrical connectors 230 and 232 are associated with the EHC 210.

Power is applied to each of the EHCs 206, 208, and 210 via the associated electrical connectors 222, 226, and 230, respectively. The power may be supplied by, for example, the electric motor 198, an energy storage device (e.g., a battery), and/or another suitable power source. Power flows through the EHCs 206, 208, and 210 to the electrical connectors 224, 228, and 232, respectively. The electrical connectors 224, 228, and 232 are electrically connected to a ground source 234, such as a ground source that is common to the power source.

The application of power to the electrically resistive EHCs 206-210 causes each of the EHCs 206-210 to generate (resistive) heat. The EHCs 206-210 in turn radiate heat to the TWCs 212-218. In this manner, the radiant heating provided by the EHCs 206-210 increases the volume of catalyst (EHC and TWC) that may be heated to the threshold temperature and effectively react with exhaust gas when the engine 102 is started.

The ECM 114 selectively applies power to the EHCs 206-210 when the engine 102 is disabled (i.e., shutdown) and the electric motor 198 is enabled (i.e., outputting torque). In other words, the ECM 114 selectively applies power to the EHCs 206-210 during operation in the electric mode. The heater actuator module 138 applies the power to all of the EHCs 206-210. The heater actuator module 138 may apply a predetermined amount of power to the EHCs 206-210. The predetermined power amount may be set based on characteristics of the EHCs 206-210 and/or the TWCs 212-218 and may be set to, for example, 3.1 kW.

Resistively heating the EHCs 206-210 to or above the threshold temperature enables the catalyst of the EHCs 206-210 to react with exhaust gas when the engine 102 is started (i.e., turned on). When power has been applied to the EHCs 206-210 for long enough to allow the radiant heat to increase the TWCs 212-218 to or above the threshold temperature, the catalysts of the TWCs 212-218 will also be able to react with the exhaust gas when the engine 102 is started. In this manner, the radiant heat provided by the EHCs 206-210 increases the effective volume of catalyst capable of reacting with exhaust gas when the engine 102 is started.

Implementation of multiple EHCs and passive TWCs rather than a single larger EHC and TWC also decreases the period necessary to increase the catalyst temperatures to or above the threshold temperature. The implementation of multiple EHCs and passive TWCs rather than the single larger EHC and TWC also provides more uniform heating and enables a lesser amount of power to be drawn to heat the catalysts to the threshold temperature. Smaller EHCs and TWCs may also manufactured more easily than larger EHCs and TWCs.

Referring now to FIG. 3, an exemplary graph of temperature versus time for an EHC and a passive TWC is presented. The passive TWC is arranged to receive radiant heat from the EHC. Exemplary trace 302 tracks the temperature of the EHC, and exemplary trace 304 tracks the temperature of the passive TWC.

The ECM 114 applies power to the EHC starting at time zero. Time zero corresponds to when the engine 102 is disabled and the electric motor 198 is producing drive torque. The EHC temperature 302 increases as time passes and power is applied to the EHC. Application of power to the EHC produces radiant heat that radiates to the passive TWC, thereby increasing the passive TWC temperature 304.

In this manner, the ECM 114 increases the EHC temperature 302 and the passive TWC temperature 304 to or above the threshold temperature while the engine 102 is disabled and not producing exhaust. The catalysts of the EHC and the passive TWC will therefore likely be capable of reacting with exhaust gas output by the engine 102 with a high conversion efficiency when the engine 102 is started. In this manner, the radiant heat provided to the passive TWC while the engine 102 is disabled increases the volume of catalyst (EHC and TWC) that is capable of reacting with the exhaust gas when the engine 102 is started.

At time 306, power is removed from the EHC. The EHC temperature 302 accordingly decreases after time 306. The passive TWC temperature 304 plateaus shortly after power is removed from the EHC as no more radiant heat is being provided to the passive TWC. Accordingly, the passive TWC temperature 304 thereafter decreases.

Figure 4:
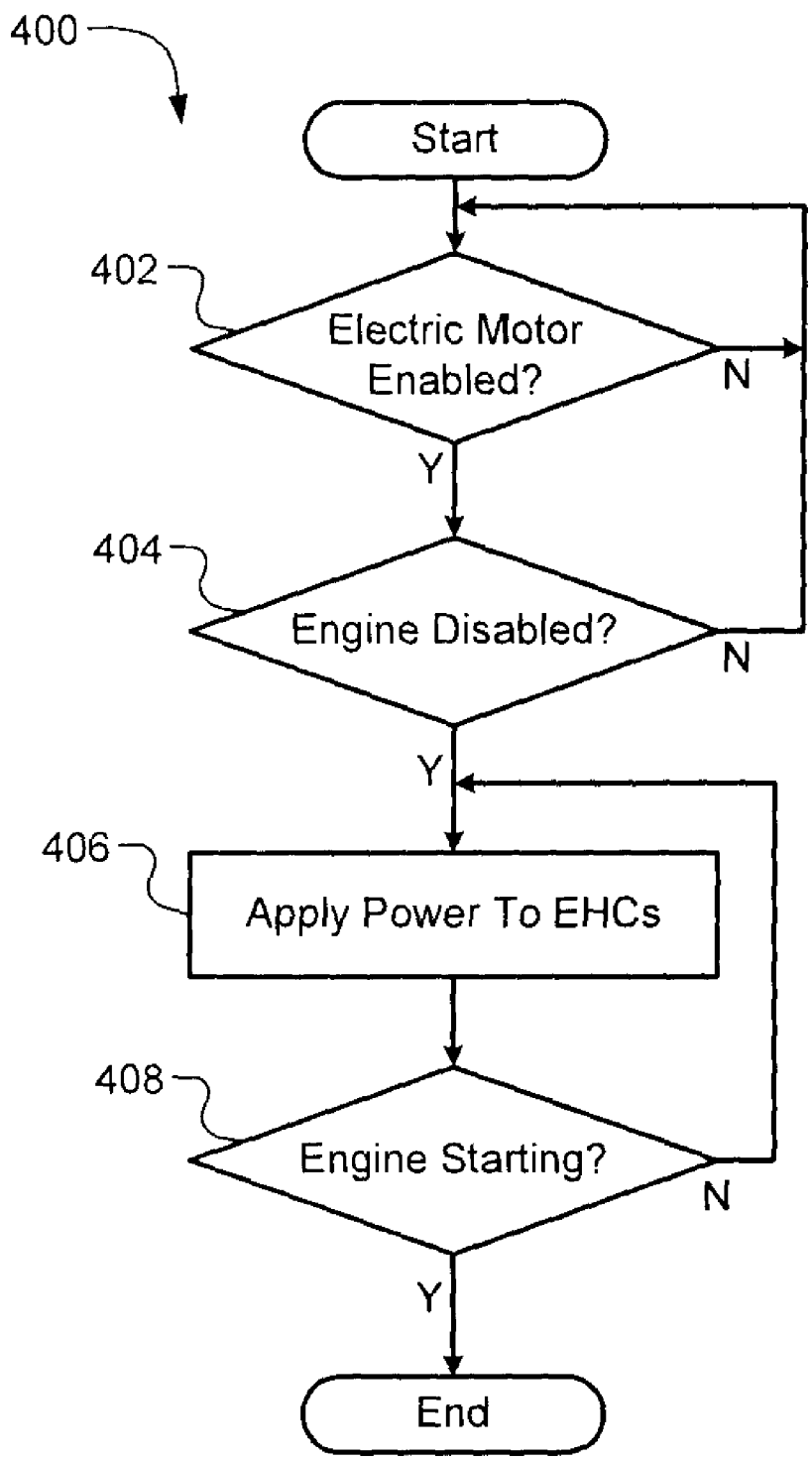
FIG. 4 is a flowchart depicting an exemplary method performed by an engine control module according to the principles of the present disclosure.

Referring now to FIG. 4, a flowchart depicting an exemplary method 400 performed by the ECM 114 is presented. The method 400 determines whether the electric motor 198 is enabled in step 402. In other words, the method 400 determines whether the electric motor 198 is operable to produce drive torque for the vehicle in step 402. If true, the method 400 continues to step 404; if false, the method 400 remains in step 402.

The method 400 determines whether the engine 102 is disabled in step 404. In other words, the method 400 determines whether the engine 102 is combusting the air/fuel mixture or producing drive torque in step 404. In one implementation, the method 400 may determine whether the engine 102 is disabled based on whether an exhaust flow rate in the exhaust system 134 is greater than zero. If true, the method 400 continues to step 406; if false, the method 400 returns to step 402. The method 400 applies power to all of the EHCs in step 406.

The method 400 determines whether the engine 102 is starting or will be started in step 408. If true, the method 400 ends; if false, the method returns to step 406 and continues to apply power to the EHCs. In one implementation, the method 400 may also adjust the power applied to the EHCs to avoid possible overheating of the EHCs or the associated passive TWCs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust treatment system comprising:
a catalyst housing that is coupled to an exhaust system and that receives exhaust gas output by an engine of a hybrid vehicle;
M three-way catalysts that are arranged inside said catalyst housing and that receive said exhaust gas, wherein M is an integer greater than or equal to four;
N electrically heated catalysts (EHCs) that are arranged inside said catalyst housing, that receive said exhaust gas, that include a substrate, that include a catalyst that is applied to said substrate, and that provide radiant heat to said M three-way catalysts when said N EHCs are powered,
wherein N is an integer greater than or equal to three,
wherein one of said M three-way catalysts is positioned upstream of all of said N EHCs; and
P buffer zones inside said catalyst housing,
wherein P is an integer greater than or equal to six.

2. A hybrid vehicle system comprising:
the exhaust treatment system of claim 1; and
an engine control module (ECM) that begins applying power to said N EHCs simultaneously when combustion within said engine is disabled.

3. The hybrid vehicle system of claim 2 wherein said ECM begins applying power to said N EHCs when combustion within said engine is disabled and torque transfer to one or more wheels of a hybrid vehicle is controlled by one or more electric motors.

4. The hybrid vehicle system of claim 2 wherein said ECM begins applying power to said N EHCs when an exhaust flowrate in an exhaust system is zero.

5. The hybrid vehicle system of claim 2 wherein said ECM regulates temperature of said M three-way catalysts based on a predetermined catalyst temperature while combustion within said engine is disabled.

6. The hybrid vehicle system of claim 5 wherein said ECM warms said M three-way catalysts to said predetermined catalyst temperature before combustion within said engine is enabled.

7. The hybrid vehicle system of claim 5 wherein said ECM controls said power to regulate said temperatures of said M three-way catalysts based on said predetermined catalyst temperature.

8. A hybrid vehicle system comprising:
the exhaust treatment system of claim 1; and
at least one processor and memory including computer readable instructions for performing at least one function, said at least one function comprising beginning to apply power to said N EHCs when combustion within said engine is disabled.

9. A hybrid vehicle system comprising:
the exhaust treatment system of claim 1; and
at least one processor and memory including computer readable instructions for performing at least one function, said at least one function comprising beginning to apply power to said N EHCs when an exhaust flowrate in an exhaust system is zero.

10. A hybrid vehicle system comprising:
the exhaust treatment system of claim 1; and
at least one processor and memory including computer readable instructions for performing at least one function, said at least one function comprising:
beginning to apply power to said N EHCs when combustion within said engine is disabled; and
regulating temperature of said M three-way catalysts based on a predetermined catalyst temperature while combustion within said engine is disabled.

11. The hybrid vehicle system of claim 10 wherein said at least one function further comprises warming said M three-way catalysts to said predetermined catalyst temperature before combustion within said engine is enabled.

12. The hybrid vehicle system of claim 10 wherein said at least one function further comprises controlling power to regulate said temperatures of said M three-way catalysts based on said predetermined catalyst temperature.

13. An exhaust treatment method comprising:
providing a catalyst housing in an exhaust system to receive exhaust gas output by an engine of a hybrid vehicle;
implementing M three-way catalysts inside said catalyst housing to receive said exhaust gas,
wherein M is an integer greater than or equal to four;
implementing N electrically heated catalysts (EHCs) inside said catalyst housing to receive said exhaust gas, each of said N EHCs including a substrate and a catalyst that is applied to said substrate, wherein N is an integer greater than or equal to three;
arranging one of said M three-way catalysts is upstream of all of said N EHCs;
providing P buffer zones in said catalyst housing,
wherein P is an integer greater than or equal to six; and
providing radiant heat to said M three-way catalysts using said N EHCs.

14. The exhaust treatment method of claim 13 further comprising providing said radiant heat by beginning to apply power to said N EHCs simultaneously when combustion within said engine is disabled.

15. The exhaust treatment method of claim 14 further comprising beginning to apply power to said N EHCs when combustion within said engine is disabled and torque transfer to one or more wheels of a hybrid vehicle is controlled by one or more electric motors.

16. The exhaust treatment method of claim 14 further comprising beginning to apply power to said N EHCs when an exhaust flowrate in an exhaust system is zero.

17. The exhaust treatment method of claim 14 further comprising regulating temperature of said M three-way catalysts based on a predetermined catalyst temperature.

18. The exhaust treatment method of claim 17 further comprising warming said M three-way catalysts to said predetermined catalyst temperature before combustion within said engine is enabled.

19. The exhaust treatment method of claim 17 further comprising regulating said temperature of said M three-way catalysts based on said predetermined catalyst temperature by controlling said application of power.

* * * * *